(12) United States Patent
Yang et al.

(10) Patent No.: US 11,656,721 B2
(45) Date of Patent: May 23, 2023

(54) PIXEL CIRCUIT, ARRAY SUBSTRATE, DISPLAY PANEL AND METHOD OF DRIVING THE SAME, AND DISPLAY DEVICE

(71) Applicant: BOE Technology Group Co., Ltd., Beijing (CN)

(72) Inventors: Shengji Yang, Beijing (CN); Xue Dong, Beijing (CN); Xiaochuan Chen, Beijing (CN); Hui Wang, Beijing (CN); Pengcheng Lu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 420 days.

(21) Appl. No.: 16/606,349

(22) PCT Filed: Feb. 25, 2019

(86) PCT No.: PCT/CN2019/076069
§ 371 (c)(1),
(2) Date: Oct. 18, 2019

(87) PCT Pub. No.: WO2019/237764
PCT Pub. Date: Dec. 19, 2019

(65) Prior Publication Data
US 2021/0365145 A1    Nov. 25, 2021

(30) Foreign Application Priority Data

Jun. 13, 2018    (CN) .......................... 201810608777.4

(51) Int. Cl.
*G06F 3/042*    (2006.01)
*G06F 3/041*    (2006.01)
(Continued)

(52) U.S. Cl.
CPC ........ *G06F 3/0421* (2013.01); *G06F 3/04166* (2019.05); *G09G 3/3266* (2013.01);
(Continued)

(58) Field of Classification Search
CPC . G06F 3/0421; G06F 3/04166; G09G 3/3266; G09G 3/3275; G09G 3/3677; G09G 3/3688; G09G 2354/00
(Continued)

(56) References Cited

U.S. PATENT DOCUMENTS 9,740,325 B2    8/2017  Yang et al.
2002/0167270 A1 * 11/2002  Siwinski ............... G06F 3/0436
                                                              313/506
(Continued)

FOREIGN PATENT DOCUMENTS

CN    104217677 A      12/2014
CN    107341472 A  *  11/2017    ............... G01L 1/24
(Continued)

OTHER PUBLICATIONS

Dec. 5, 2019—(CN) Second Office Action Appn 201810608777.4 with English Translation.

*Primary Examiner* — Amare Mengistu
*Assistant Examiner* — Gloryvid Figueroa-Gibson
(74) *Attorney, Agent, or Firm* — Banner & Witcoff, Ltd.

(57) ABSTRACT

A pixel circuit, an array substrate, a display panel and a method of driving the same, and a display device. The pixel circuit includes: a light emitting device; a light sensitive touch control sub-circuit, connected to a first scan terminal, a second scan terminal, a data signal terminal and a signal reading line, the light sensitive touch control sub-circuit being configured to generate a detection signal based on a light intensity under a control of a first scan signal from the first scan terminal and a data signal from the data signal (Continued)

terminal and to output the detection signal through the signal reading line; and a light emitting driving control sub-circuit, connected to the first scan terminal, the second scan terminal and the data signal terminal, the light emitting driving control sub-circuit being configured to drive the light emitting device.

19 Claims, 7 Drawing Sheets

(51) Int. Cl.
G09G 3/3266 (2016.01)
G09G 3/3275 (2016.01)
G09G 3/36 (2006.01)

(52) U.S. Cl.
CPC ......... G09G 3/3275 (2013.01); G09G 3/3677 (2013.01); G09G 3/3688 (2013.01); G09G 2354/00 (2013.01)

(58) Field of Classification Search
USPC ........................................................ 345/173
See application file for complete search history.

(56) References Cited

U.S. PATENT DOCUMENTS

| | | | |
|---|---|---|---|
| 2009/0096352 A1* | 4/2009 | Spindler | H01L 51/5088 445/24 |
| 2010/0201275 A1* | 8/2010 | Cok | G09G 3/3208 315/158 |
| 2016/0027853 A1* | 1/2016 | Ahn | H01L 27/3262 438/151 |
| 2016/0267843 A1* | 9/2016 | Wang | G09G 3/3258 |
| 2016/0274719 A1* | 9/2016 | Yang | G06F 3/04166 |
| 2017/0206824 A1* | 7/2017 | Sun | G09G 3/3266 |
| 2018/0150670 A1* | 5/2018 | Jang | H01L 27/3227 |
| 2019/0012510 A1* | 1/2019 | Xu | G01L 1/24 |

FOREIGN PATENT DOCUMENTS

| | | |
|---|---|---|
| CN | 107341472 A | 11/2017 |
| CN | 108803932 A | 11/2018 |

* cited by examiner

FIG. 8 at a first stage of a frame, resetting the light sensitive touch control sub-circuit and the driving sub-circuit by the reset sub-circuit through the voltage provided by the initial voltage terminal, under the control of the enable signal of the enable signal terminal —S10 at a second stage of the frame, writing the data signal from the data signal terminal to the driving sub-circuit and compensating for the threshold voltage of the driving sub-circuit by the data writing sub-circuit under the control of the first scan signal from the first scan terminal; and converting the data signal from the data signal terminal into a voltage difference and storing the voltage difference by the light sensitive touch control sub-circuit under the control of the first scan signal of the first scan terminal, to maintain the turning on of the light sensitive transistor in the third stage —S20 at a third phase of the frame, connecting the driving sub-circuit with the first voltage terminal and the light emitting device by the light emitting control sub-circuit under the control of the second scan signal from the second scan terminal to enable the driving sub-circuit to drive the light emitting device to emit light; and outputting the detection signal by the light sensitive touch control sub-circuit through the signal reading line under the control of the second scan signal from the second scan terminal —S30

… collection sub-circuit, and a second electrode of the fourth transistor is connected to the signal reading line.

In some embodiments, the data writing sub-circuit comprises: a fifth transistor and a sixth transistor;

a gate electrode of the fifth transistor is connected to the first scan terminal, and a first electrode of the fifth transistor is connected to the data signal terminal, and a second electrode of the fifth transistor is connected to the driving sub-circuit; and a gate electrode of the sixth transistor is connected to the first scan terminal, a first electrode and a second electrode of the sixth transistor are both connected to the driving sub-circuit.

In some embodiments, the light emitting control sub-circuit comprises: a seventh transistor and an eighth transistor;

a gate electrode of the seventh transistor is connected to the second scan terminal, and a first electrode of the seventh transistor is connected to the first voltage terminal, and a second electrode of the seventh transistor is connected to the driving sub-circuit; and a gate electrode of the eighth transistor is connected to the second scan terminal, and a first electrode of the eighth transistor is connected to the driving sub-circuit, and a second electrode of the eighth transistor is connected to the light emitting device.

In some embodiments, the driving sub-circuit comprises: a driving transistor and a first capacitor;

a gate electrode of the driving transistor is connected to the reset sub-circuit and the data writing sub-circuit, a first electrode of the driving transistor is connected to the light emitting control sub-circuit and the data writing sub-circuit, and a second electrode of the driving transistor is connected to the light emitting control sub-circuit and the data writing sub-circuit; and an electrode of the first capacitor is connected to the gate electrode of the driving transistor, and another electrode of the first capacitor is connected to the reset sub-circuit and the initial voltage terminal.

At least one embodiment of the present disclosure provides an array substrate, which comprises a TFT backplane;

wherein the TFT backplane comprises:

a substrate; and the light sensitive touch control sub-circuit and the light emitting drive control sub-circuit of any above-mentioned pixel circuit arranged on the substrate; and the light emitting device of the pixel circuit is on the TFT backplane in a light outgoing direction of the array substrate, and the light emitting device is a top emission light emitting device.

In some embodiments, the light sensitive touch control sub-circuit comprises a light sensitive transistor;

the array substrate further comprises a light shading layer between the TFT backplane and the light emitting device in a sub-pixel area where the pixel circuit is arranged; and the light shading layer comprises a hollowed-out area exposing the light sensitive transistor.

In some embodiments, a planarization layer is between the light shading layer and the TFT backplane;

the planarization layer has a thickness in a range of 1.5 um-2.5 um.

In some embodiments, the TFT backplane further comprises: the driving sub-circuit, the data writing sub-circuit and the light emitting control sub-circuit as mentioned above and the reset sub-circuit as mentioned above arranged on the substrate.

In some embodiments, the reset sub-circuit comprises a first transistor and a second transistor, the light sensitive touch control sub-circuit comprises a third transistor, a fourth transistor and a light sensitive transistor, the data writing sub-circuit comprises a fifth transistor and a sixth transistor, the light emitting control sub-circuit comprises a seventh transistor and an eighth transistor, the driving sub-circuit comprises a driving transistor; and the first transistor, the second transistor, the third transistor, the fourth transistor, the light sensitive transistor, the fifth transistor, the sixth transistor, the seventh transistor, the eighth transistor and the driving transistor are polysilicon transistors.

In some embodiments, the light emitting device comprises: an anode, an organic material functional layer and a cathode, and the anode, the organic material functional layer and the cathode are sequentially arranged on the TFT backplane in the light outgoing direction of the array substrate; and the cathode is made of a metal material.

In some embodiments, a display area of the array substrate is divided into a plurality of portions, each of the plurality of portions comprises a plurality of sub-pixels, the sub-pixels in different areas are identical in terms of an amount and an arrangement manner; and the sub-pixel at a same position of each of the plurality of areas comprises the pixel circuit.

At least one embodiment of the present disclosure provides a display panel, which comprises the above-mentioned array substrate.

At least one embodiment of the present disclosure provides a method of driving a display panel, the display panel comprising:

a light emitting device;

a light sensitive touch control sub-circuit, connected to a first scan terminal, a second scan terminal, a data signal terminal and a signal reading line, and the light sensitive touch control sub-circuit being configured to generate a detection signal, based on a light intensity under a control of a first scan signal from the first scan terminal and a data signal from the data signal terminal and output the detection signal through the signal reading line, under a control of a second scan signal from the second scan terminal; and a light emitting driving control sub-circuit, connected to the first scan terminal, the second scan terminal and the data signal terminal, the light emitting driving control sub-circuit being configured to drive the light emitting device, based on the data signal from the data signal terminal, under a control of the first scan signal from the first scan terminal and the second scan signal from the second scan terminal, the method comprising: controlling the light sensitive touch control sub-circuit to achieve a light sensitive touch control and controlling the light emitting driving control sub-circuit to drive the light emitting device, through the first scan signal from the first scan terminal, the second scan signal from the second scan terminal and the data signal from the data signal terminal.

In some embodiments, the light emitting driving control sub-circuit comprises:

a driving sub-circuit;

a data writing sub-circuit, connected to the driving sub-circuit, the first scan terminal and the data signal terminal, and the data writing sub-circuit being configured to write the data signal from the data signal terminal to the driving sub-circuit and compensate for a threshold voltage of the driving sub-circuit, under a control of the first scan signal from the first scan terminal;

a light emitting control sub-circuit, connected to the driving sub-circuit, a first voltage terminal, the light emitting device and the second scan terminal, and the light emitting control sub-circuit being configured to input a signal from the first voltage terminal to the driving sub-circuit and supply a driving current generated by the driving sub-circuit to the light emitting device, under a control of the second scan signal from the second scan terminal, so that the driving sub-circuit drives the light emitting device to emit light, and the display panel further comprising: a reset sub-circuit, connected to the light sensitive touch control sub-circuit, the driving sub-circuit, an enable signal terminal and an initial voltage terminal, and the reset sub-circuit being configured for resetting the light sensitive touch control sub-circuit and the driving sub-circuit through a voltage provided by the initial voltage terminal, under a control of an enable signal from the enable signal terminal, and the controlling the light sensitive touch control sub-circuit to achieve the light sensitive touch control and controlling the light emitting driving control sub-circuit to drive the light emitting device, through the first scan signal from the first scan terminal, the second scan signal from the second scan terminal and the data signal from the data signal terminal comprises:

resetting, by the reset sub-circuit, the light sensitive touch control sub-circuit and the driving sub-circuit through the voltage provided by the initial voltage terminal, under the control of the enable signal from the enable signal terminal;

writing, by the data writing sub-circuit, the data signal from the data signal terminal into the driving sub-circuit and compensating for the threshold voltage of the driving sub-circuit, under the control of the first scan signal from the first scan terminal; and converting, by the light sensitive touch control sub-circuit, the data signal from the data signal terminal into a voltage difference and storing the voltage difference under a control of the first scan signal from the first scan terminal, to maintain turning on of a light sensitive transistor in the light sensitive touch control sub-circuit;

inputting, by the light emitting control sub-circuit, the signal from the first voltage terminal to the driving sub-circuit and providing the driving current generated by the driving sub-circuit to the light emitting device under the control of the second scan signal from the second scan terminal, so that the driving sub-circuit drives the light emitting device to emit light; and outputting, by the light sensitive touch control sub-circuit, the detection signal through the reading signal line under the control of the second scan signal from the second scan terminal. At least one embodiment of the present disclosure provides a display device, which comprises the above-mentioned display panel.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

REFERENCE SIGNS

10—reset sub-circuit; 20—light sensitive touch control sub-circuit; 21—light sensitive touch control collection sub-circuit; 22—output sub-circuit; 30—data writing sub-circuit; 40—driving sub-circuit; 50—light emitting control sub-circuit; 60—TFT backplane; 70—light shading layer; 701—hollowed-out region; 80—planarization layer; 100—pixel unit; D—light emitting device; $V_{data}$—data signal terminal; $V_{int}$—initial voltage terminal; EM—enable signal terminal; S1—first scan terminal; S2—second scan terminal; RL—signal reading line; V1—first voltage terminal; V2—second voltage terminal.

DETAILED DESCRIPTION

In order to make the objectives, technical solutions and advantages of the embodiments of the present disclosure more clear, the technical solutions of the embodiments of the present disclosure will be clearly and completely described below with reference to the accompanying drawings. Apparently, the described embodiments are only part of the embodiments of the present disclosure, but not all the embodiments. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

With the development of display technology, LCD has shown certain limitations. Due to the advantages of low energy consumption, low production costs, self-illumination, wide viewing angle, fast response and the like, active matrix organic light-emitting diode (AMOLED) displays have attracted more and more attentions, and become one of the focuses in the field of display research.

Unlike LCDs which use stable voltages to control the deflection of the liquid crystal molecules to realize the displaying of images, organic light-emitting diode (OLED) devices in the AMOLED, which is considered as the next-generation display technology, are current-driven devices. OLED devices generate radiant light by the combination of electrons and holes (ions with positive charges), that is, directly converting electricity into light, so stable currents are required in the displaying process to control luminescence.

During the displaying process, liquid crystal molecules are not required by the AMOLED to be used as a medium of gray scale display, and thus the problem that the light sensitive touch control affects displaying images does not exist.

At least one embodiment of the present disclosure provides a pixel circuit, which includes:

a light emitting device;

a light sensitive touch control sub-circuit, connected with a first scan terminal, a second scan terminal, a data signal terminal and a signal reading line, configured to generate a detection signal based on a illumination intensity under a control of a first scan signal from the first scan terminal and a data signal from the data signal terminal and output the detection signal through the signal reading line under a control of a second scan signal from the second scan terminal; and a light emitting driving control sub-circuit, connected with the first scan terminal, the second scan terminal and the data signal terminal, configured to drive the light emitting device to emit light based on the data signal from the data signal terminal under a control of the first scan signal from the first scan terminal and the second scan signal from the second scan terminal.

Figure 1:
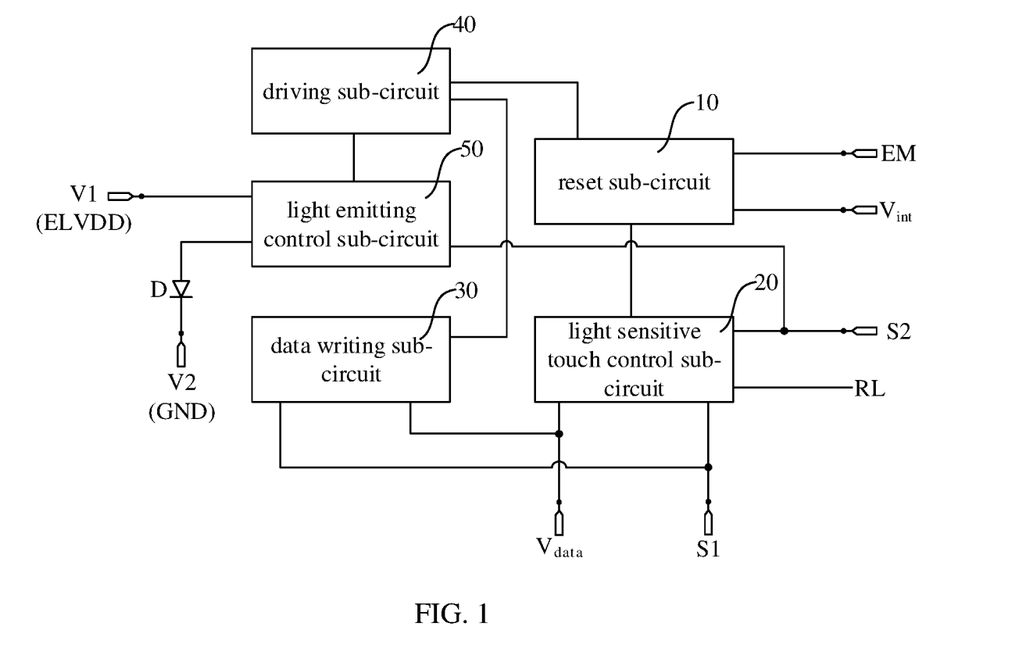
FIG. 1 is a schematic structural diagram of a pixel circuit provided by at least one embodiment of the present disclosure.

As shown in FIG. 1, at least one embodiment of the present disclosure provides a pixel circuit, which includes: a reset sub-circuit 10, a light sensitive touch control sub-circuit 20, a data writing sub-circuit 30, a driving sub-circuit 40, a light emitting control sub-circuit 50 and a light emitting device D. For example, the above-mentioned light emitting driving control sub-circuit may include the data writing sub-circuit 30, the driving sub-circuit 40, and the light emitting control sub-circuit 50.

The reset sub-circuit 10 is connected with the light sensitive touch control sub-circuit 20, the driving sub-circuit 40, an enable signal terminal EM and an initial voltage terminal $V_{int}$, and the reset sub-circuit 10 is configured to reset the light sensitive touch control sub-circuit 20 and the driving sub-circuit 40 by the voltage provided by the initial voltage terminal $V_{int}$ under a control of an enable signal from the enable signal terminal EM. However, it should be understood that in some embodiments, the pixel circuit may not include the reset sub-circuit 10, which is not limited by the embodiments of the present disclosure.

The light sensitive touch control sub-circuit 20 is connected with a first scan terminal S1, a second scan terminal S2, a data signal terminal $V_{data}$ and a signal reading line RL, and the light sensitive touch control sub-circuit 20 is configured to generate a detection signal based on the intensity of illumination under a control of a first scan signal from the first scan terminal S1 and a data signal from the data signal terminal $V_{data}$; and output the detection signal through the signal reading line RL under a control of a second scan signal from the second scan terminal S2;

The data writing sub-circuit 30 is connected with the driving sub-circuit 40, the first scan terminal S1 and the data signal terminal $V_{data}$, and the data writing sub-circuit 30 is configured to write a data signal from the data signal terminal $V_{data}$ in the driving sub-circuit 40 and compensate for the threshold voltage of the driving sub-circuit 40 under a control of the first scan signal from the first scan terminal S1.

The light emitting control sub-circuit 50 is connected with the driving sub-circuit 40, a first voltage terminal V1, the light emitting device D and the second scan terminal S2, and the light emitting control sub-circuit 50 is configured to connect the driving sub-circuit 40 with the first voltage terminal V1 and the light emitting device D to make the driving light emitting device of the driving sub-circuit 40 to emit light under a control of the second scan signal from the second scan terminal S2.

It should be understood that the light emitting device D is also connected to the second voltage terminal V2. Herein, the anode of the light emitting device D is connected to the light emitting control sub-circuit 50, and the cathode of the light emitting device D is connected to the second voltage terminal V2.

In some embodiments, as shown in FIG. 1, the first voltage terminal V1 may be the power supply voltage terminal ELVDD, and the second voltage terminal V2 may be the ground terminal GND.

In the pixel circuit provided by at least one embodiment of the present disclosure, on one hand, the data signal from the data signal terminal $V_{data}$ is written to the driving sub-circuit 40 by the data writing sub-circuit 30 under a control of the first scan terminal S1 to compensate for the threshold voltage of the driving sub-circuit 40, and based on this, the driving sub-circuit 40 is connected to the first voltage terminal V1 and the light emitting device D by the light emitting control sub-circuit 50 under the control of the second scan terminal S2 to enable the driving sub-circuit 40 to drive the light emitting device D to emit light, thereby achieving displaying images; and the current flowing across the light emitting device D is not affected by threshold voltage of the driving sub-circuit 40 and thus the problem that the drifting of the threshold voltage results in uneven display brightness is solved. On the other hand, the detection signal is generated by the light sensitive touch control sub-circuit 20 based on the intensity of illumination under the control of the first scan terminal S1 and the data signal terminal $V_{data}$, and the detection signal is output by the signal reading line RL under a control of the second scan terminal S2, therefore the light sensitive touch control can be realized. Herein, the light sensitive touch control sub-circuit 20, the data writing sub-circuit 30, and the light emitting control sub-circuit 50 may be integrated in the light sensitive in cell touch into the AMOLED display by reusing the first scan terminal, the second scan terminal and the data terminal.

Figure 2:
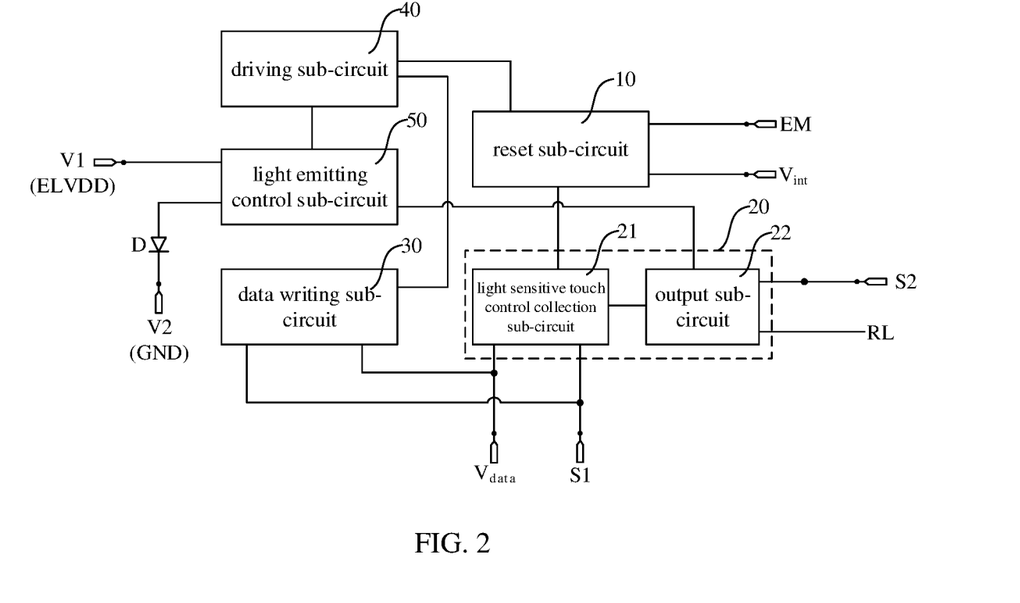
FIG. 2 is a schematic structural diagram of another pixel circuit provided by at least one embodiment of the present disclosure.

In some embodiments, as shown in FIG. 2, the light sensitive touch control sub-circuit 20 includes a light sensitive touch control collection sub-circuit 21 and an output sub-circuit 22.

The light sensitive touch control collection sub-circuit 21 is connected with the first scan terminal S1 and the data signal terminal $V_{data}$, and the light sensitive touch control collection sub-circuit 21 is configured to generate a detection signal based on a illumination intensity under a control of a first scan signal from the first scan terminal S1 and a data signal from the data signal terminal $V_{data}$;

The output sub-circuit 22 is connected with the light sensitive touch control collection sub-circuit 21, the second scan terminal S2 and the signal reading line RL, and the output sub-circuit 22 is configured to output the detection signal by the signal reading line RL under a control of the second scan signal from the second scan terminal S2.

That is, the light sensitive touch control collection sub-circuit 21 and the data writing sub-circuit 30 reuse the first scan terminal S1 and the signal terminal $V_{data}$. The output sub-circuit 22 and the light emitting control sub-circuit 50 reuse the second scan terminal S2.

Figure 3:
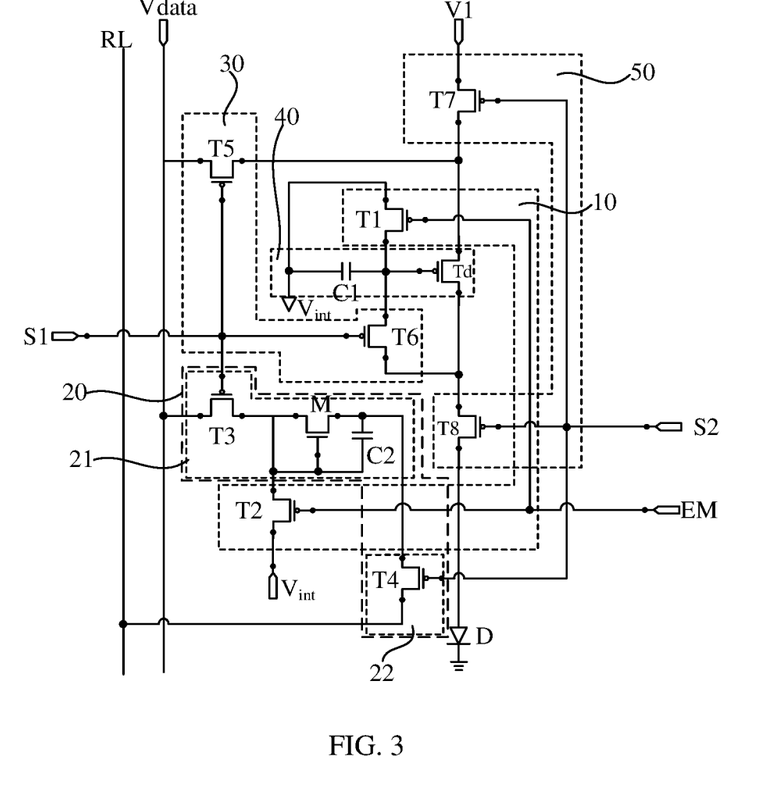
FIG. 3 is a schematic structural diagram illustrating various sub-circuits provided by at least one embodiment of the present disclosure.

In some embodiments, as shown in FIG. 3, a driving sub-circuit 40 includes a driving transistor Td and a first capacitor C1.

The gate electrode of the driving transistor Td is connected to the reset sub-circuit 10 and the data writing sub-circuit 30, the first electrode of the driving transistor Td is connected to the light-emission control sub-circuit 50 and the data writing sub-circuit 30, and the second electrode of the driving transistor Td is connected to the light emitting control sub-circuit 50 and the data writing sub-circuit 30.

An electrode of the first capacitor C1 is connected to the gate electrode of the driving transistor Td, and another electrode of the first capacitor C1 is connected to the reset sub-circuit 10 and the initial voltage terminal $V_{int}$.

In some embodiments, as shown in FIG. 3, a light sensitive touch control collection sub-circuit 21 includes a third transistor T3, a light sensitive transistor M and a second capacitor C2.

The gate electrode of the third transistor T3 is connected to the first scan terminal S1, the first electrode of the third transistor T3 is connected to the data signal terminal $V_{data}$, and the second electrode of the third transistor T3 is connected to the first electrode of the light sensitive transistor M.

The gate electrode of the light sensitive transistor M is connected to the first electrode of the light sensitive transistor M, and the second electrode of the light sensitive transistor M is connected to the output sub-circuit 22.

An electrode of the second capacitor C2 is connected to the second electrode of the light sensitive transistor M, and another electrode of the second capacitor C2 is connected to the gate electrode of the light sensitive transistor M.

In some embodiments, as shown in FIG. 3, an output sub-circuit 22 includes a fourth transistor T4.

The gate electrode of the fourth transistor T4 is connected to the second scan terminal S2, the first electrode of the fourth transistor T4 is connected to the light sensitive touch control collection sub-circuit 21, and the second electrode of the fourth transistor T4 is connected to the signal reading line RL.

In a case where the light sensitive touch control sub-circuit 21 comprises the third transistor T3, the light sensitive transistor M and the second capacitor C2, the first electrode of the fourth transistor T4 is connected to the light sensitive transistor M in the light sensitive touch control collection sub-circuit 21.

In some embodiments, as shown in FIG. 3, the reset sub-circuit 10 includes a first transistor T1 and a second transistor T2.

The gate electrode of the first transistor T1 is connected to the enable signal terminal EM, the first electrode of the first transistor T1 is connected to the driving sub-circuit 40 and the initial voltage terminal, and the second electrode of the first transistor T1 is connected to the driving sub-circuit 40.

The gate electrode of the first transistor T2 is connected to the enable signal terminal EM, the first electrode of the first transistor T2 is connected to the light sensitive touch control sub-circuit 20, and the second electrode of the first transistor T2 is connected to the initial voltage terminal $V_{int}$.

In a case where the driving sub-circuit 40 comprises the driving transistor Td and the first capacitor C1, the first electrode of the first transistor T1 is connected to the other electrode of the first capacitor C1 (the electrode which is not connected to the driving transistor Td), and the second electrode of the first transistor T1 is connected to the gate electrode of the driving transistor Td.

In a case where the light sensitive touch control sub-circuit 20 comprises the light sensitive touch control collection sub-circuit 21 and the output sub-circuit 22, the first electrode of the second transistor T2 is connected to the light sensitive touch control collection sub-circuit 21. Based on this, in a case where the light sensitive touch control sub-circuit 21 comprises the third transistor T3, the light sensitive transistor M and the second capacitor C2, the first electrode of the second transistor T2 is connected to the first electrode of the light sensitive transistor M.

In some embodiments, as shown in FIG. 3, a data writing sub-circuit 30 includes a fifth transistor T5 and a sixth transistor T6.

The gate electrode of the fifth transistor T5 is connected to the first scan terminal S1, the first electrode of the fifth transistor T5 is connected to the data signal terminal $V_{data}$, and the second electrode of the fifth transistor T5 is connected to the driving sub-circuit 40.

The gate electrode of the sixth transistor T6 is connected to the first scan terminal S1, the first and the second electrodes of the sixth transistor T6 are both connected to the driving sub-circuit 40.

In a case where the driving sub-circuit 40 comprises the driving transistor Td and the first capacitor C1, the second electrode of the fifth transistor T5 is connected to the first electrode of the driving transistor Td. The first electrode of the sixth transistor T6 is connected to the gate electrode of the driving transistor Td, and the second electrode of the sixth transistor T6 is connected to the second electrode of the driving transistor Td.

In some embodiments, as shown in FIG. 3, the light emitting control sub-circuit 50 includes a seventh transistor T7 and an eighth transistor T8.

The gate electrode of the seventh transistor T7 is connected to the second scan terminal S2, the first electrode of the seventh transistor T7 is connected to the first voltage terminal V1, and the second electrode of the seventh transistor T7 is connected to the driving sub-circuit 40.

The gate electrode of the eighth transistor T8 is connected to the second scan terminal S2, the first electrode of the eighth transistor T8 is connected to the driving sub-circuit

40, and the second electrode of the eighth transistor T8 is connected to the light emitting device D.

In a case where the driving sub-circuit 40 comprises the driving transistor Td and the first capacitor C1, the second electrode of the seventh transistor T7 is connected to the first electrode of the driving transistor Td. The first electrode of the eighth transistor T8 is connected to the second electrode of the driving transistor Td.

In some embodiments, the light emitting device D includes a current-driven light emitting device such as a light emitting diode (LED) or an organic light emitting diode (OLED) and so on. Hereinafter, the pixel circuit will be described by taking the case where the light-emitting device D is an OLED as an example. Other structures having the same functions as those of the light-emitting device D are not described herein, but these structures should fall within the protection scope of the present disclosure.

It should be noted that the foregoing is only illustrative example of each sub-circuit, and other structures having the same function as each sub-circuit should fall within the protection scope of the present disclosure. For example, for the driving sub-circuit 40, in some other embodiments, a plurality of driving transistors Td may be connected in parallel. In some other embodiments, a plurality of first capacitors C1 may be connected in parallel. For example, for the light sensitive touch control sub-circuit 20, in some other embodiments, a plurality of third transistors T3 of the light sensitive touch control collection sub-circuit 21 may be connected in parallel. In some other embodiments, a plurality of fourth transistor T4 of the output sub-circuit 22 in the light sensitive touch control sub-circuit 20 may be connected in parallel.

The above-mentioned T1~T7 are all switching transistors, and the first electrode and the second electrode are not limited for any of the switching transistors. In some embodiments, the first electrode is the drain electrode, and the second electrode is the source electrode. In other embodiments, the first electrode is the source electrode, and the second electrode is the drain electrode.

Herein, the switching transistor used in the present disclosure may be a P-type transistor or an N-type transistor. The P-type switching transistor is turned on when the gate is at a low level and turned off when the gate is at a high level. The N-type switching transistor is turned on when the gate is at a high level and turned off when the gate is at a low level.

For the driving transistor Td, in some embodiments, the driving transistor Td is a P-type driving transistor. Since the voltage of the source electrode of the P-type driving transistor is higher than the voltage of the drain electrode, the first electrode of the driving transistor Td is the source electrode, and the second electrode is the drain electrode. The P-type driving transistor is in a magnification state or a saturated state when the voltage of the gate is at a low level (the voltage of the gate is less than the voltage of the source electrode) and the absolute value of the difference between the voltage of the gate and the voltage of the source electrode is greater than the threshold voltage. In other embodiments, the driving transistor Td is an N-type transistor, the first electrode of the driving transistor Td is the drain electrode, and the second electrode is the source electrode. The N-type driving transistor is in a magnification state or a saturated state when the gate voltage is at a high level (the voltage of the gate is greater than the voltage of the source electrode) and the absolute value of the difference between the voltage of the gate and the voltage of the source electrode is greater than the threshold voltage.

For the light sensitive transistor M, in some embodiments, the sensitive transistor M is an N-type light sensitive transistor. In other embodiments, the light sensitive transistor M is a P-type light sensitive transistor.

When the transistors T1~T7 and the driving transistor Td shown in FIG. 3 are P-type transistors and the light sensitive transistor M is an N-type transistor, the working process of the pixel circuit shown in FIG. 3 will be described in detail in combination with the timing diagram shown in FIG. 4.

Figure 5A:
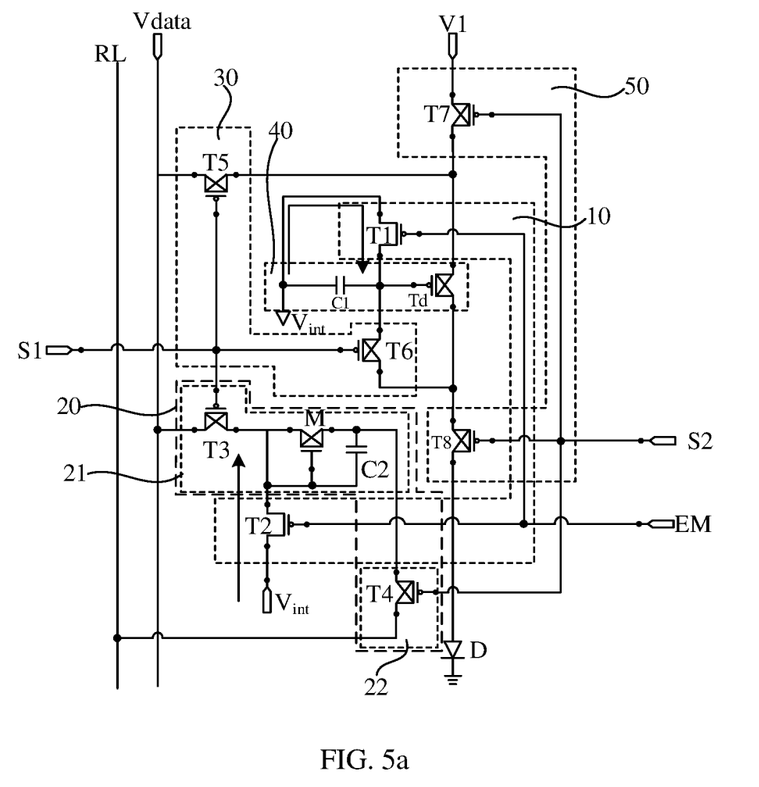
FIGS. 5a~5c are equivalent circuit diagrams of the pixel circuit shown in FIG. 2 corresponding to P1-P3 stage respectively.

At the first stage P1, the equivalent circuit diagram of the pixel circuit as shown in FIG. 3 is shown in FIG. 5*a*. In all of the equivalent circuit diagrams, the transistor in the turned-off condition is indicated by "x".

The first transistor T1 and the second transistor T2 are turned on by inputting a signal from the enable signal line to the enable signal terminal EM.

The first transistor T1 is turned on, the voltage across the first capacitor C1 is discharged to the voltage of the initial voltage terminal $V_{int}$ (which may also be GND), and the voltage pre-stored in the first capacitor C1 is reset.

The second transistor T2 is turned on, thereby resetting the light sensitive transistor M and the second capacitor C1.

Figure 5B:
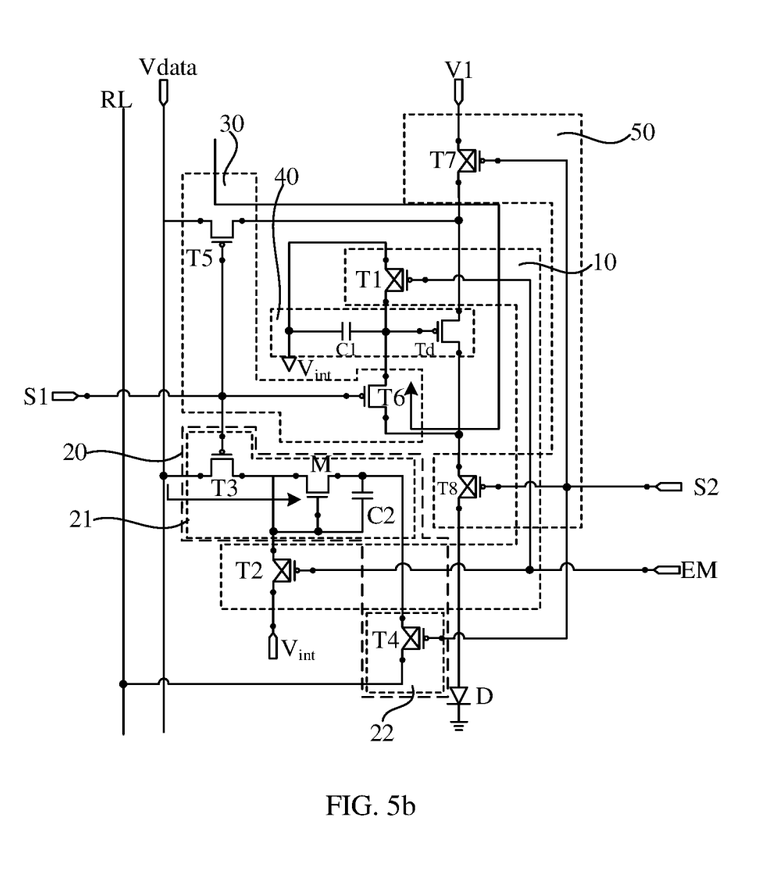

At the second stage P2, the equivalent circuit diagram of the pixel circuit as shown in FIG. 3 is shown in FIG. 5*b*.

The signal is inputted from the first scan signal line to the first scan terminal S1, the fifth transistor T5 and the sixth transistor T6 are turned on, and at the same time, the third transistor T3 and the light sensitive transistor M are turned on.

The fifth transistor T5 is turned on to transmit the data signal from the data voltage terminal $V_{data}$ to the first electrode of the driving transistor Td, so that the driving transistor Td is turned on. Since the driving transistor Td is turned on, the data signal is transmitted to the gate electrode of the driving transistor Td by the driving transistor Td and the turned-on sixth transistor T6 to charge the first capacitor C1 until an electrode of the first capacitor C1 connected with the gate electrode of the driving transistor Td is charged to $V_{data}+V_{th}$. Since the voltage difference between the gate and the source electrode of the driving transistor Td is $V_{th}$, the driving transistor Td is turned off. In this process, since the other electrode of the first capacitor C1 is connected to the initial voltage terminal $V_{int}$, the voltage at the other electrode of the first capacitor C1 is always 0. Therefore, when charging is completed, the potential of the electrode of the first capacitor C1 connected to the gate electrode of the driving transistor Td is always maintained at $V_{data}+V_{th}$.

At the second stage P2, since the eighth transistor T8 is in the turned-off state, the current generated by the driving transistor Td does not flow to the light emitting device D, and the power consumption can be reduced.

The third transistor T3 is turned on to transmit the data signal from the data voltage terminal $V_{data}$ to the first electrode of the light sensitive transistor M, and the first electrode and the gate electrode of the light sensitive transistor M are connected, so the light sensitive transistor M is turned on. Further, a potential change occurs in the light sensitive transistor M, and the voltage between the gate and the second electrode of the light sensate transistor M is stored in the second capacitor C2.

Figure 5C:
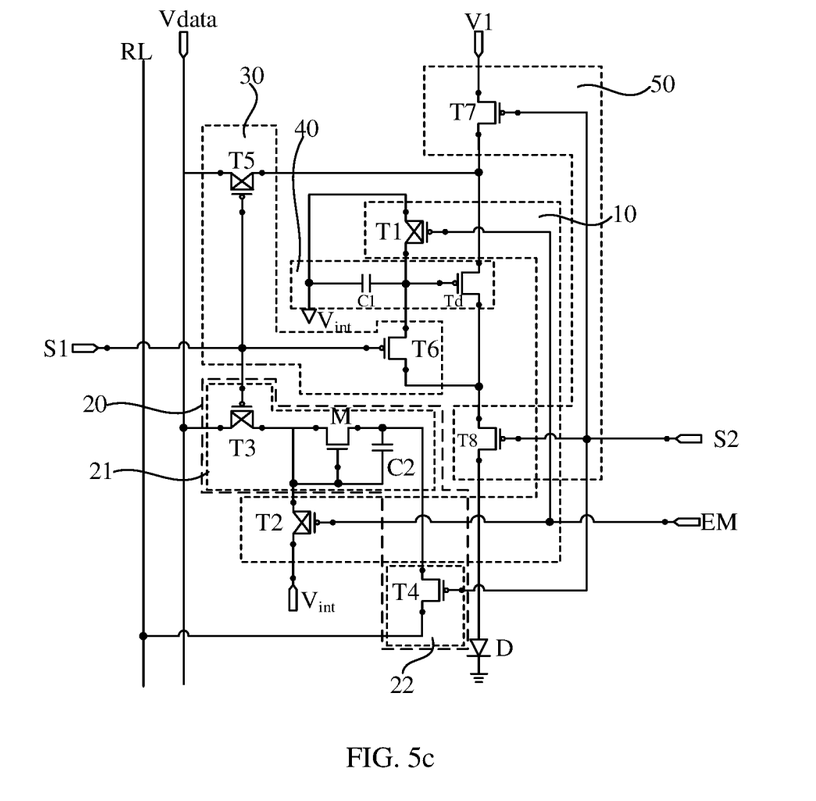

At the third stage P3, the equivalent circuit diagram of the pixel circuit as shown in FIG. 3 is shown in FIG. 5*c*.

The signal is inputted from the second scan signal line to the second scan terminal S2, the seventh transistor T7 and the eighth transistor T8 are turned on, and at the same time, the fourth transistor T4 and the light sensitive transistor M are turned on.

The seventh transistor T7 and the eighth transistor T8 are turned on, the first electrode of the driving transistor Td is connected to the first voltage terminal V1, and the second electrode of the driving transistor Td is connected to the light emitting device D, so that the drive current may flow through the light emitting device D and thus the light emitting device D emits light.

The following may be obtained based on the saturation current formula of the driving transistor Td:

$$Ids=1/2\times K\times (Vgs-Vth)^2=1/2\times K\times (V_{data}+V_{th}-V1-V_{th})^2=1/2\times K\times (V1-V_{data})^2,$$

where $K=W/L\times C\times U$, W/L is the width-to-length ratio of the driving transistor Td, C is the capacitance of the channel insulating layer, and u is the channel carrier mobility.

It can be seen that the driving current of the driving transistor Td is not affected by $V_{th}$, and is only related to $V_{data}$. The problem that the threshold voltage ($V_{th}$) of the driving transistor Td drifts due to the manufacturing process and long-term operations is completely solved, thereby eliminating the influence of the drifting of the threshold voltage on the drive current and guaranteeing the normal operation of the OLED.

Due to the second capacitor C2, the light sensitive transistor M may be kept turned on at the third stage P3. At this stage, if a touch operation occurs, the light generated by the light emitting device D at the position that is touched is reflected by a finger to be irradiated to the light sensitive transistor M, so that the light sensitive transistor M generates current. The current is transmitted to the signal reading line RL by the fourth transistor T4 which is turned on. The signal reading line RL transmits this signal to an amplifier at the end and the signal is transmitted to the processor for the data computational analysis after being amplified.

The processor may compare a threshold and the difference between the currents generated by the light sensitive transistor M before and after the touch operation to determine whether a touch operation occurs. The position which is touched may be determined based on the crossing of the first scan line connected with the first signal terminal S1 and the signal reading line TL. That is, the X-coordinate of the position which is touched is determined by the first scan line, and the Y-coordinate of the position which is touched is determined by the signal reading line TL.

At least one embodiment of the present disclosure further provides an array substrate, which includes a TFT backplane. The TFT backplane includes a substrate and the reset sub-circuit 10, the light sensitive touch control sub-circuit 20, the data writing sub-circuit 30, the driving sub-circuit 40, the light emitting control sub-circuit 50 of the above-mentioned pixel circuit arranged on the substrate. The light emitting device D of the pixel circuit is arranged on the TFT backplane, and the light emitting device D is of a top-emission type.

That is, in manufacturing the array substrate, the TFT backplane is formed at first, and the TFT backplane includes the pixel circuit expect the light emitting device D. After the TFT backplane is manufactured, a pixel defining layer, the light emitting device D, etc. are formed on the TFT backplane. The pixel defining layer is used to bound individual sub-pixel areas, and each light emitting device D is formed in a sub-pixel area.

In some embodiments, the light emitting device D includes at least an anode, an organic material functional layer and a cathode sequentially arranged on the TFT backplane. The anode is connected to the second electrode of the eighth transistor T8. In some other embodiments, the organic material functional layer include a light emitting layer, a hole transporting layer and an electron transporting layer. Furthermore, the organic material functional layer may further include a hole injection layer and an electron injection layer.

In some embodiments, in order to increase the amount of the out-going light of the light emitting device D, the cathode may adopt metal materials to produce a micro-cavity effect. It should be noted that since the light emitting device D is a top-emission device, the cathode has a small thickness so that light can exit.

The array substrate provided by at least one embodiment of the present disclosure has the same beneficial effect as the above-mentioned pixel circuit, which will not be repeated herein.

In some embodiments, the light sensitive touch control sub-circuit 20 includes a light sensitive transistor M. Based on this, as shown in FIG. 6, in the sub-pixel region where the pixel circuit is arranged, the array substrate further includes a light shading layer 70 arranged between the TFT backplane 60 and the light emitting devices D; and the light shading layer 70 includes a hollowed-out region 701 exposing the light sensitive transistor M.

Figure 6:
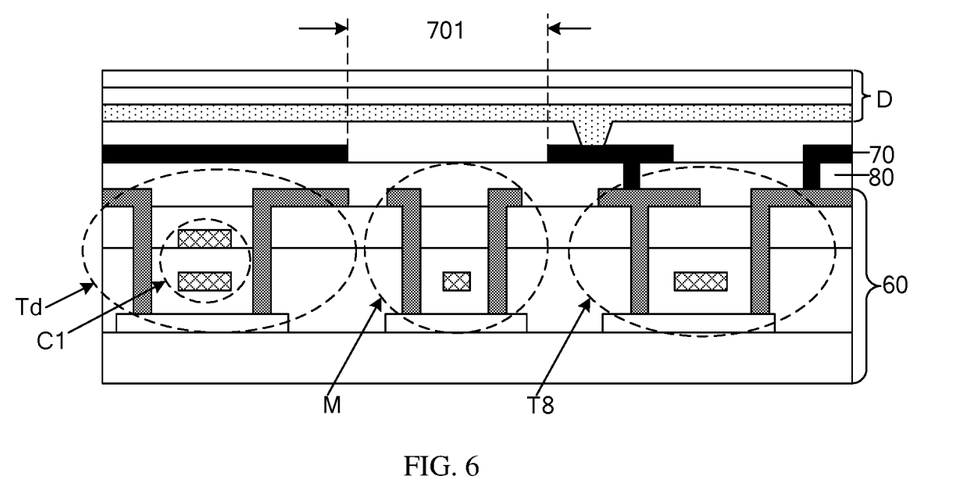
FIG. 6 is a schematic structural diagram of an array substrate provided by at least one embodiment of the present disclosure.

It should be noted that, the driving transistor Td is a polysilicon transistor as shown in FIG. 6. The active layer is arranged near the substrate, the gate is arranged on the active layer, and an opposite electrode is further arranged on the gate and configured to form the first capacitor C1 with the gate, and then a source electrode and a drain electrode are formed.

By arranging the light shading layer 70 in the sub-pixel region where the pixel circuit is arranged, and exposing the hollowed-out region 701 of the light shading layer 70 to the light sensitive transistor M, the light shading layer 70 may provide a light convergence effect, thereby increasing the amount of touch signals.

Based on this, a planarization layer 80 is arranged between the light shading layer 70 and the TFT backplane 60; and the thickness of the planarization layer 80 is 1.5~2.5 um. Thus, the parasitic capacitance between the light shading layer 70 and the electrodes and the signal lines and the like on the TFT backplane 60 may be reduced.

It should be noted that in order to form the light emitting device D in a flat area during the subsequent forming operation of the light emitting device D so as to guarantee the performance of the light emitting device D, another planarization layer is formed between the light shading layer 70 and the light emitting device D.

In some embodiments, the light shading layer 70 and the signal lines (including data lines, scan lines, enable control lines, etc.) on the TFT backplane 60 are arranged not to overlap with each other as far as possible. That is, the orthographic projection of the light shading layer 70 and the orthographic projection of the signal lines on the substrate do not overlap. Therefore, the loads of the signal lines are reduced.

In a case where the reset sub-circuit 10 includes the first transistor T1 and the second transistor T2, the light sensitive touch control sub-circuit 20 includes the third transistor T3, the fourth transistor T4 and the light sensitive transistor M, the data writing sub-circuit 30 includes the fifth transistor T5 and the sixth transistor T6, the light emitting control sub-circuit 50 includes the seventh transistor T7 and the eighth transistor T8, and the driving sub-circuit 40 includes the driving transistor Td, the first transistor T1, the second transistor T2, the third transistor T3, the fourth transistor T4, the light sensitive transistor M, the fifth transistor T5, the sixth transistor T6, the seventh transistor T7, the eighth transistor T8 and the driving transistor Td are all polysilicon transistors.

In some embodiments, the first transistor T1, the second transistor T2, the third transistor T3, the fourth transistor T4, the light sensitive transistor M, the fifth transistor T5, the sixth transistor T6, the seventh transistor T7, the eighth transistor T8 and the driving transistor Td are formed in synchronization. That is, the first transistor T1, the second transistor T2, the third transistor T3, the fourth transistor T4, the light sensitive transistor M, the fifth transistor T5, the sixth transistor T6, the seventh transistor T7, the eighth transistor T8 and the driving transistor Td are formed in synchronization in a manufacturing process of polysilicon transistors (for example, low-temperature polysilicon transistors).

In some embodiments, the display area of the array substrate is divided into a plurality of portions, and each of the plurality of portions includes a plurality of sub-pixels, the sub-pixels in different portions are the same in terms of amount and arrangement manner. The sub-pixel at the same position of each portion includes the pixel circuit.

The distribution density of the sub-pixels including the pixel circuit provided by at least one embodiment of the present disclosure on the array substrate may be set at discretion based on the size of the pixel which may be provided by the array substrate and the touch accuracy requirements. In a case where the touch accuracy requirements are high, the distribution density of the sub-pixels are increased correspondingly.

Figure 7:
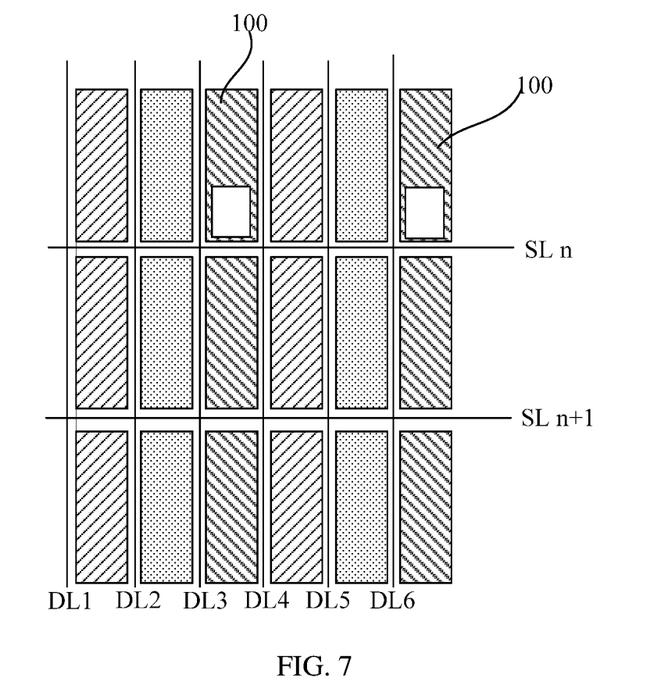
FIG. 7 is a schematic arrangement diagram of sub-pixels including the pixel circuit provided by at least one embodiment of the present disclosure on an array substrate.

For example, as shown in FIG. 7, the pixel units including the pixel circuits are arranged in a 3*3 matrix. That is, one pixel unit out of every three pixel units on the array substrate in the horizontal direction (in the direction of the gate lines SL) and in the vertical direction (in the direction of the data lines DL) includes the pixel circuit.

Figure 8:
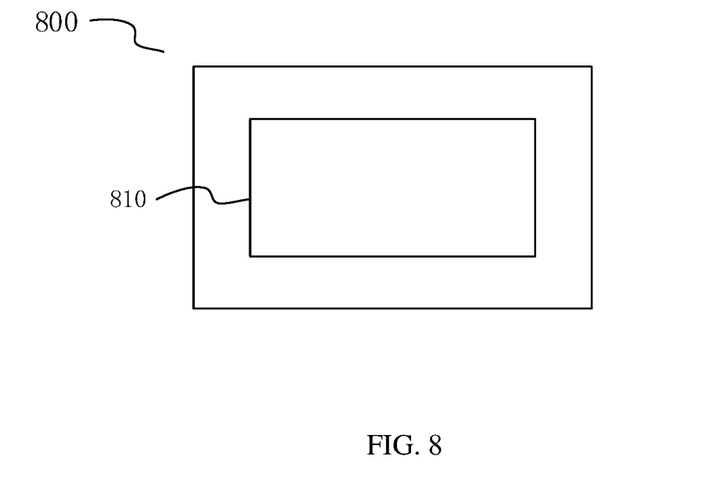
FIG. 8 is a schematic structural diagram of a display panel provided by at least one embodiment of the present disclosure.

At least one embodiment of the present disclosure further provides a display panel, which includes the above-mentioned array substrate. As shown in FIG. 8, the display panel 800 according to at least one embodiment of the present disclosure includes any of the above-mentioned array substrates 810.

At least one embodiment of the present disclosure further provides a method of driving a display panel, and the method is used to drive the above-mentioned display panel. The method may include: controlling the light sensitive touch control sub-circuit to achieve a light sensitive touch control and controlling the light emitting driving control sub-circuit to drive the light emitting device, through the first scan signal from the first scan terminal, the second scan signal from the second scan terminal and the data signal from the data signal terminal.

Figure 9:
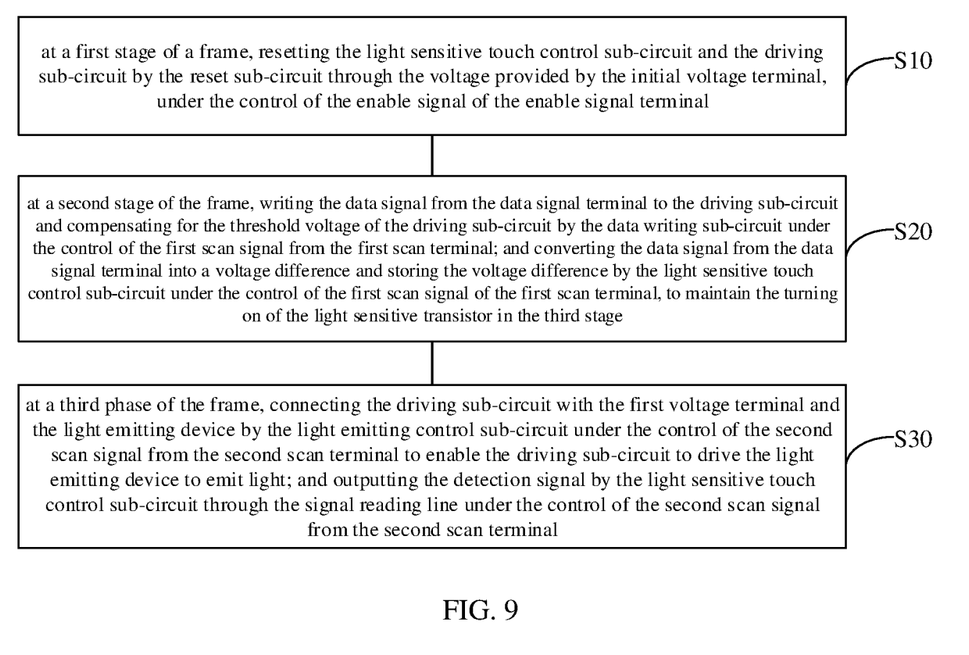
FIG. 9 is a flow chart of a method of driving a display panel provided by at least one embodiment of the present disclosure.

As shown in FIG. 9, in some embodiments, in a case where the display panel adopts the structure as shown in FIG. 1, the method includes:

S10, at a first stage P1 of a frame, resetting the light sensitive touch control sub-circuit 20 and the driving sub-circuit 40 by the reset sub-circuit 10 through the voltage provided by the initial voltage terminal $V_{int}$ under the control of the enable signal of the enable signal terminal EM.

S20, at a second stage P2 of the frame, writing the data signal from the data signal terminal $V_{data}$ to the driving sub-circuit 40 and compensating for the threshold voltage of the driving sub-circuit 40 by the data writing sub-circuit 30 under the control of the first scan signal from the first scan terminal S1; and converting the data signal from the data signal terminal $V_{data}$ into a voltage difference and storing the voltage difference by the light sensitive touch control sub-circuit 20 under the control of the first scan signal of the first scan terminal S1, to maintain the turning on of the light sensitive transistor M in the third stage P3.

S30, at a third phase P3 of the frame, connecting the driving sub-circuit 40 with the first voltage terminal V1 and the light emitting device D by the light emitting control sub-circuit 50 under the control of the second scan signal from the second scan terminal S2 to enable the driving sub-circuit 40 to drive the light emitting device D to emit light; and outputting the detection signal by the light sensitive touch control sub-circuit 20 through the signal reading line RL under the control of the second scan signal from the second scan terminal S2.

Figure 4:
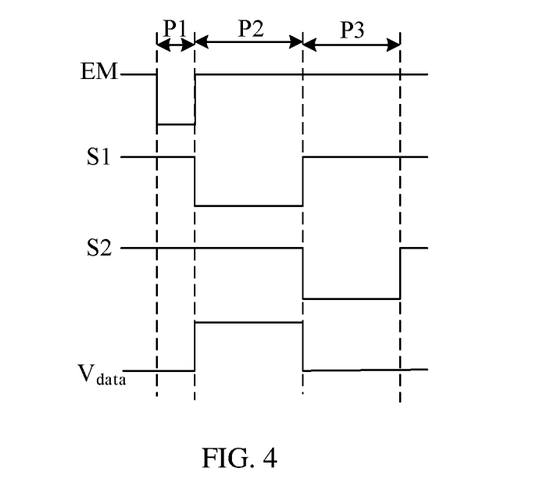
FIG. 4 is a timing diagram of various control signals in an operating process of a pixel circuit.

The description of the first stage P1, the second stage P2 and the third stage P3 may refer to the above-mentioned timing of FIG. 4, which will not be repeated herein.

Figure 10:
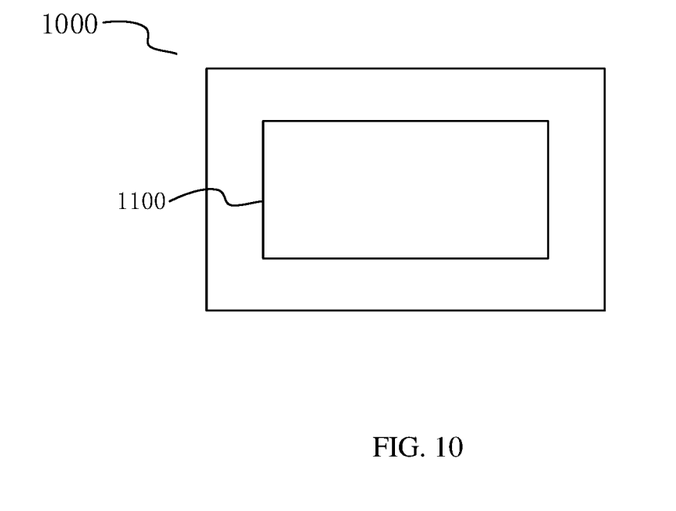
FIG. 10 is a schematic structural diagram of a display device provided by at least one embodiment of the present disclosure.

At least one embodiment of the present disclosure further provides a display device, which includes the above-mentioned display panel. As shown in FIG. 10, the display panel 1000 according to at least one embodiment of the present disclosure includes any of the above-mentioned array substrates 1100. The display device including the display panel may be any product or component having a display function such as an electronic paper, a mobile phone, a tablet computer, a television set, a display, a notebook computer, a digital photo frame and a navigator.

Based on the pixel circuit, the array substrate, the display panel and the method of driving the same and the display device provided by the embodiments of the present disclosure, on one hand, the data signal from the data signal terminal $V_{data}$ is written to the driving sub-circuit by the data writing sub-circuit under a control of the first scan terminal to compensate for the threshold voltage of the driving sub-circuit, and based on this, the driving sub-circuit is connected to the first voltage terminal and the light emitting device by the light emitting control sub-circuit under the control of the second scan terminal to enable the driving sub-circuit to drive the light emitting device to emit light, thereby achieving displaying images; and the current flowing across the light emitting device is not affected by threshold voltage of the driving sub-circuit and thus the problem that the drifting of the threshold voltage results in uneven display brightness is solved; on the other hand, the detection signal is generated by the light sensitive touch control sub-circuit based on the light intensity under the control of the first scan terminal and the data signal terminal, and the detection signal is output by the signal reading line under the control of the second scan terminal, therefore the light sensitive touch control can be realized. Herein, the light sensitive touch control sub-circuit, the data writing sub-circuit, and the light emitting control sub-circuit may be integrated in the light sensitive in cell touch into the AMOLED display by reusing the first scan terminal, the second scan terminal and the data terminal.

The foregoing merely are exemplary embodiments of the disclosure, and not intended to define the scope of the disclosure, and the scope of the disclosure is determined by the appended claims.

What is claimed is:
1. An array substrate, comprising a thin film transistor (TFT) backplane, wherein the TFT backplane comprises:
    a substrate; and
    a light sensitive touch control sub-circuit and a light emitting driving control sub-circuit of a pixel circuit arranged on the substrate; and a light emitting device of the pixel circuit on the substrate in a light outgoing direction of the array substrate, wherein the light emitting device is a top emission light emitting device, wherein the light sensitive touch control sub-circuit comprises a light sensitive transistor, the array substrate further comprises a light shading layer between the substrate and the light emitting device in a sub-pixel area where the pixel circuit is arranged, the light shading layer comprises a hollowed-out area exposing the light sensitive transistor, a planarization layer is between the light shading layer and the substrate, and an orthographic projection of the light sensitive transistor on the substrate overlaps with an orthographic projection of the planarization layer on the substrate, the TFT backplane further comprises a driving sub-circuit included in the light emitting driving control sub-circuit, the driving sub-circuit comprises a driving transistor and a first capacitor, wherein an active layer of the driving transistor and an active layer of the light sensitive transistor are located on a same layer, and are both directly disposed on the substrate, and the driving transistor and the first capacitor are located between the substrate and the light shading layer, orthographic projections of the first capacitor and the driving transistor on the substrate are within an orthographic projection of the light shading layer on the substrate.

2. The array substrate according to claim 1, wherein the planarization layer has a thickness in a range of 1.5 um-2.5 um.

3. The array substrate according to claim 1, wherein the TFT backplane further comprises: a data writing sub-circuit, and a light emitting control sub-circuit and a reset sub-circuit arranged on the substrate, the data writing sub-circuit is connected to the driving sub-circuit, a first scan terminal, and a data signal terminal, and the data writing sub-circuit is configured to write a data signal of the data signal terminal to the driving sub-circuit and compensate for a threshold voltage of the driving sub-circuit, under a control of a first scan signal from the first scan terminal, the light emitting control sub-circuit is connected to the driving sub-circuit, a first voltage terminal, the light emitting device, and a second scan terminal, and the light emitting control sub-circuit is configured to input a signal from the first voltage terminal to the driving sub-circuit and supply a driving current generated by the driving sub-circuit to the light emitting device, under a control of a second scan signal from the second scan terminal, so that the driving sub-circuit drives the light emitting device to emit light, and the reset sub-circuit is connected to the light sensitive touch control sub-circuit, the driving sub-circuit, an enable signal terminal, and an initial voltage terminal, and the reset sub-circuit is configured to reset the light sensitive touch control sub-circuit and the driving sub-circuit through a voltage provided by the initial voltage terminal, under a control of an enable signal from the enable signal terminal.

4. The array substrate according to claim 3, wherein the reset sub-circuit comprises a first transistor and a second transistor, the light sensitive touch control sub-circuit comprises a third transistor and a fourth transistor, the data writing sub-circuit comprises a fifth transistor and a sixth transistor, the light emitting control sub-circuit comprises a seventh transistor and an eighth transistor, and the first transistor, the second transistor, the third transistor, the fourth transistor, the light sensitive transistor, the fifth transistor, the sixth transistor, the seventh transistor, the eighth transistor, and the driving transistor are polysilicon transistors.

5. The array substrate according to claim 1, wherein the light emitting device comprises: an anode, an organic material functional layer, and a cathode, the anode, the organic material functional layer, and the cathode are sequentially arranged on the substrate in the light outgoing direction of the array substrate, the cathode is made of a metal material, a display area of the array substrate is divided into a plurality of portions, at least one of the plurality of portions comprises a plurality of sub-pixels, sub-pixels in different portions are identical in terms of an amount and an arrangement manner, and a sub-pixel at a same position of the at least one of the plurality of portions comprises the pixel circuit.

6. A display panel, comprising the array substrate according to claim 1.

7. A method of driving the display panel according to claim 6, the display panel comprising:

the light emitting device;

the light sensitive touch control sub-circuit, connected to a first scan terminal, a second scan terminal, a data signal terminal, and a signal reading line, and the light sensitive touch control sub-circuit being configured to generate a detection signal, based on a light intensity, under a control of a first scan signal from the first scan terminal and a data signal from the data signal terminal and to output the detection signal through the signal reading line under a control of a second scan signal from the second scan terminal; and the light emitting driving control sub-circuit, connected to the first scan terminal, the second scan terminal, and the data signal terminal, the light emitting driving control sub-circuit being configured to drive the light emitting device, based on the data signal from the data signal terminal, under a control of the first scan signal from the first scan terminal and the second scan signal from the second scan terminal, the method comprising: controlling the light sensitive touch control sub-circuit to achieve a light sensitive touch control and controlling the light emitting driving control sub-circuit to drive the light emitting device, through the first scan signal from the first scan terminal, the second scan signal from the second scan terminal, and the data signal from the data signal terminal.

8. The method according to claim 7, wherein the light emitting driving control sub-circuit comprises:

a data writing sub-circuit, connected to the driving sub-circuit, the first scan terminal, and the data signal terminal, and the data writing sub-circuit being configured to write the data signal from the data signal terminal to the driving sub-circuit and compensate for a threshold voltage of the driving sub-circuit under a control of the first scan signal from the first scan terminal; and a light emitting control sub-circuit, connected to the driving sub-circuit, a first voltage terminal, the light emitting device, and the second scan terminal, and the light emitting control sub-circuit being configured to input a signal from the first voltage terminal to the driving sub-circuit and supply a driving current generated by the driving sub-circuit to the light emitting device under a control of the second scan signal from the second scan terminal, so that the driving sub-circuit drives the light emitting device to emit light, the display panel further comprising: a reset sub-circuit, connected to the light sensitive touch control sub-circuit, the driving sub-circuit, an enable signal terminal, and an initial voltage terminal, and the reset sub-circuit being configured for resetting the light sensitive touch control sub-circuit and the driving sub-circuit through a voltage provided by the initial voltage terminal under a control of an enable signal from the enable signal terminal, the controlling the light sensitive touch control sub-circuit to achieve the light sensitive touch control and controlling the light emitting driving control sub-circuit to drive the light emitting device, through the first scan signal from the first scan terminal, the second scan signal from the second scan terminal, and the data signal from the data signal terminal comprises:

resetting, by the reset sub-circuit, the light sensitive touch control sub-circuit and the driving sub-circuit through the voltage provided by the initial voltage terminal, under the control of the enable signal from the enable signal terminal;

writing, by the data writing sub-circuit, the data signal from the data signal terminal into the driving sub-circuit and compensating for the threshold voltage of the driving sub-circuit, under the control of the first scan signal from the first scan terminal; and converting, by the light sensitive touch control sub-circuit, the data signal from the data signal terminal into a voltage difference and storing the voltage difference under a control of the first scan signal from the first scan terminal, to maintain turning on of the light sensitive transistor in the light sensitive touch control sub-circuit;

inputting, by the light emitting control sub-circuit, the signal from the first voltage terminal to the driving sub-circuit and providing the driving current generated by the driving sub-circuit to the light emitting device under the control of the second scan signal from the second scan terminal, so that the driving sub-circuit drives the light emitting device to emit light; and outputting, by the light sensitive touch control sub-circuit, the detection signal through the reading signal line under the control of the second scan signal from the second scan terminal.

9. A display device, comprising the display panel according to claim 6.

10. The array substrate according to claim 1, wherein the pixel circuit comprises:

the light emitting device;

the light sensitive touch control sub-circuit, connected to a first scan terminal, a second scan terminal, a data signal terminal, and a signal reading line, the light sensitive touch control sub-circuit being configured to generate a detection signal, based on a light intensity, under a control of a first scan signal from the first scan terminal and a data signal from the data signal terminal and to output the detection signal through the signal reading line under a control of a second scan signal from the second scan terminal; and the light emitting driving control sub-circuit, connected to the first scan terminal, the second scan terminal, and the data signal terminal, the light emitting driving control sub-circuit being configured to drive the light emitting device, based on the data signal from the data signal terminal, under a control of the first scan signal from the first scan terminal and the second scan signal of the second scan terminal.

11. The array substrate according to claim 10, wherein the light emitting driving control sub-circuit comprises:

a data writing sub-circuit, connected to the driving sub-circuit, the first scan terminal, and the data signal terminal, and the data writing sub-circuit being configured to write the data signal from the data signal terminal to the driving sub-circuit and to compensate for a threshold voltage of the driving sub-circuit, under a control of the first scan signal from the first scan terminal; and a light emitting control sub-circuit, connected to the driving sub-circuit, a first voltage terminal, the light emitting device, and the second scan terminal, and the light emitting control sub-circuit being configured to input a signal from the first voltage terminal to the driving sub-circuit and supply a driving current generated by the driving sub-circuit to the light emitting device, under a control of the second scan signal from the second scan terminal, so that the driving sub-circuit drives the light emitting device to emit light.

12. The array substrate according to claim 11, further comprising:

a reset sub-circuit, connected to the light sensitive touch control sub-circuit, the driving sub-circuit, an enable signal terminal, and an initial voltage terminal, and the reset sub-circuit being configured to reset the light sensitive touch control sub-circuit and the driving sub-circuit through a voltage provided by the initial voltage terminal, under a control of an enable signal from the enable signal terminal.

13. The array substrate according to claim 12, wherein the reset sub-circuit comprises: a first transistor and a second transistor, a gate electrode of the first transistor is connected to the enable signal terminal, and a first electrode of the first transistor is connected to the driving sub-circuit and the initial voltage terminal, and a second electrode of the first transistor is connected to the driving sub-circuit, and a gate electrode of the second transistor is connected to the enable signal terminal, and a first electrode of the second transistor is connected to the light sensitive touch control sub-circuit, and a second electrode of the second transistor is connected to the initial voltage terminal.

14. The array substrate according to claim 12, wherein a gate electrode of the driving transistor is connected to the reset sub-circuit and the data writing sub-circuit, a first electrode of the driving transistor is connected to the light emitting control sub-circuit and the data writing sub-circuit, and a second electrode of the driving transistor is connected to the light emitting control sub-circuit and the data writing sub-circuit, and an electrode of the first capacitor is connected to the gate electrode of the driving transistor, and another electrode of the first capacitor is connected to the reset sub-circuit and the initial voltage terminal.

15. The array substrate according to claim 11, wherein the data writing sub-circuit comprises: a fifth transistor and a sixth transistor, a gate electrode of the fifth transistor is connected to the first scan terminal, and a first electrode of the fifth transistor is connected to the data signal terminal, and a second electrode of the fifth transistor is connected to the driving sub-circuit, and a gate electrode of the sixth transistor is connected to the first scan terminal, a first electrode and a second electrode of the sixth transistor are both connected to the driving sub-circuit.

16. The array substrate according to claim 11, wherein the light emitting control sub-circuit comprises: a seventh transistor and an eighth transistor, a gate electrode of the seventh transistor is connected to the second scan terminal, and a first electrode of the seventh transistor is connected to the first voltage terminal, and a second electrode of the seventh transistor is connected to the driving sub-circuit, and a gate electrode of the eighth transistor is connected to the second scan terminal, and a first electrode of the eighth transistor is connected to the driving sub-circuit, and a second electrode of the eighth transistor is connected to the light emitting device.

17. The array substrate according to claim 10, wherein the light sensitive touch control sub-circuit comprises: a light sensitive touch control collection sub-circuit and an output sub-circuit, the light sensitive touch control collection sub-circuit is connected to the first scan terminal and the data signal terminal, and the light sensitive touch control collection sub-circuit is configured to generate the detection signal, based on the light intensity, under the control of the first scan signal from the first scan terminal and the data signal from the data signal terminal, and the output sub-circuit is connected to the light sensitive touch control collection sub-circuit, the second scan terminal, and the signal reading line, and the output sub-circuit is configured to output the detection signal through the signal reading line, under the control of the second scan signal from the second scan terminal.

18. The array substrate according to claim 17, wherein the light sensitive touch control collection sub-circuit comprises: a third transistor, the light sensitive transistor, and a storage capacitor, a gate electrode of the third transistor is connected to the first scan terminal, and a first electrode of the third transistor is connected to the data signal terminal, and a second electrode of the third transistor is connected to a first electrode of the light sensitive transistor, a gate electrode of the light sensitive transistor is connected to the first electrode of the light sensitive transistor, and a second electrode of the light sensitive transistor is connected to the output sub-circuit, and an electrode of the storage capacitor is connected to the second electrode of the light sensitive transistor, and another electrode of the storage capacitor is connected to the gate electrode of the light sensitive transistor.

19. The array substrate according to claim 17, wherein the output sub-circuit comprises: a fourth transistor, wherein a gate electrode of the fourth transistor is connected to the second scan terminal, and a first electrode of the fourth transistor is connected to the light sensitive touch control collection sub-circuit, and a second electrode of the fourth transistor is connected to the signal reading line.

* * * * *